United States Patent [19]

Oran et al.

[11] 4,218,921
[45] Aug. 26, 1980

[54] METHOD AND APPARATUS FOR SHAPING AND ENHANCING ACOUSTICAL LEVITATION FORCES

[75] Inventors: William A. Oran, Huntsville; LeRoy H. Berge, Athens; Donald A. Reiss; Jerry L. Johnson, both of Huntsville, all of Ala.

[73] Assignee: The United States of America as represented by the Administrator of the National Aeronautics and Space Administration, Washington, D.C.

[21] Appl. No.: 57,466

[22] Filed: Jul. 13, 1979

[51] Int. Cl.³ .................................................. F16C 32/00
[52] U.S. Cl. ........................................ 73/505; 308/10
[58] Field of Search .................. 73/504, 505; 74/5 R; 269/20; 308/10

[56] References Cited

U.S. PATENT DOCUMENTS

| 3,164,022 | 1/1965 | Ensley | 73/505 |
| 3,882,732 | 5/1975 | Fletcher et al. | 73/505 |

OTHER PUBLICATIONS

"An Electromagnetic Sound Generator for Producing Intense High Frequency Sound", by St. Clair, Review of Scientific Instr., May 1941, (pp. 250-256).

Primary Examiner—James J. Gill
Attorney, Agent, or Firm—J. H. Beumer; J. R. Manning; L. D. Wofford, Jr.

[57] ABSTRACT

A method and apparatus for enhancing and shaping acoustical levitation forces in a single-axis acoustic resonance system wherein specially shaped drivers and reflectors are utilized to enhance the levitation force and better contain fluid substances by means of field shaping.

13 Claims, 5 Drawing Figures

U.S. Patent      Aug. 26, 1980      4,218,921
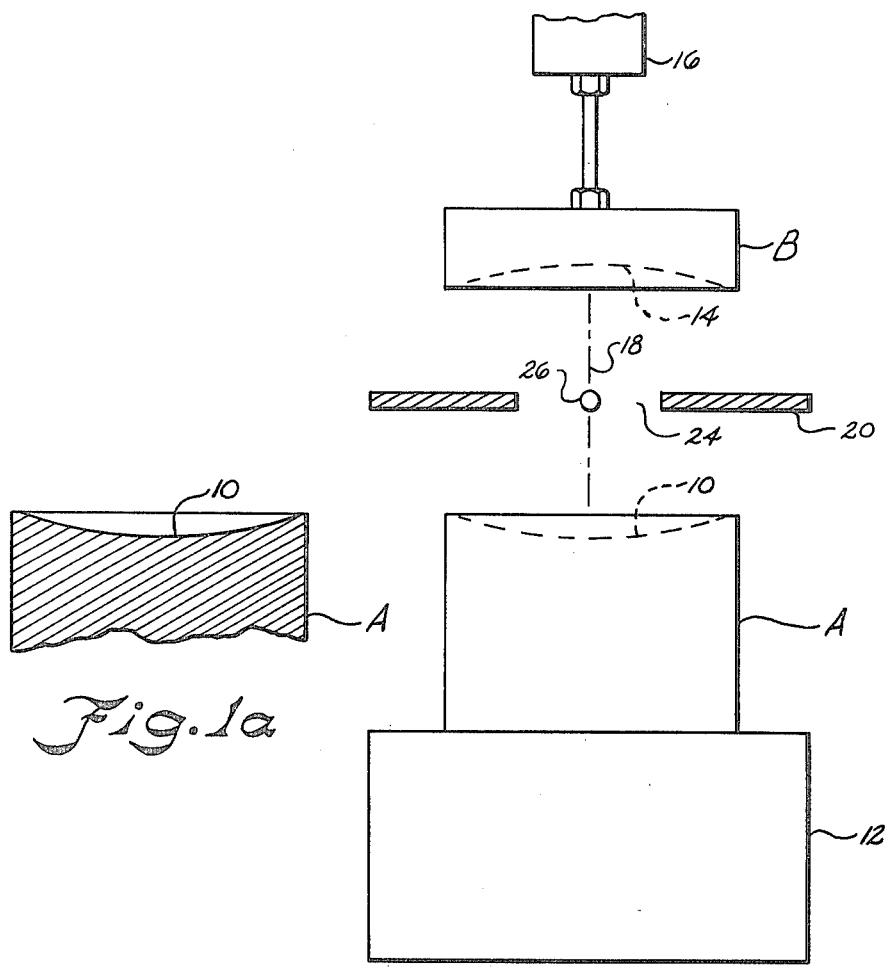
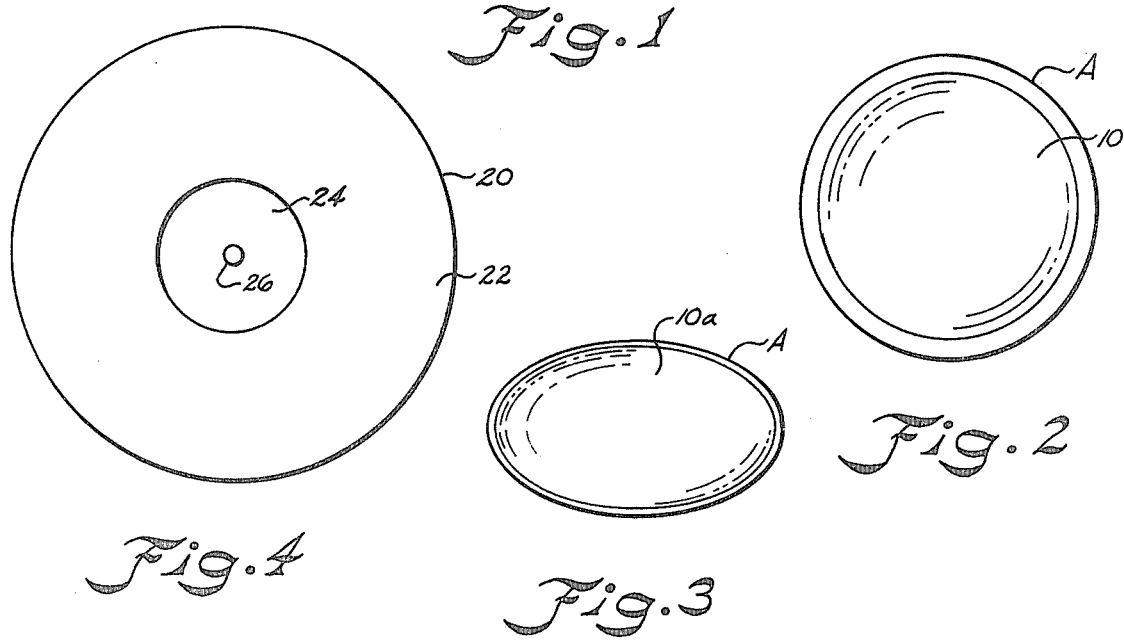

METHOD AND APPARATUS FOR SHAPING AND ENHANCING ACOUSTICAL LEVITATION FORCES

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates to an apparatus and method for suspending and positioning objects by the use of acoustical energy. In many instances, the study of materials and material processes and the determination of their properties can be more readily accomplished when the specimens under study are maintained out of contact with the walls of containers and solid supports. A levitated specimen of a material may be advantageously heated in a levitation furnace or by a spot heating device such as a laser.

Heretofore, apparatus has been proposed for suspending objects in zero gravity such as disclosed in U.S. Pat. No. 3,882,732 wherein three dynamic speaker devices are oriented along the three major axis of a chamber and are driven so as to provide a spherical nodal position at the intersection wherein an object may be suspended.

Another prior device commonly referred to as a St. Clair device has been utilized wherein a solid cylindrical vibrating element having a planar face is driven in an ultrasonic generator and a planar reflector is positioned in such a manner above the vibrator element that a standing wave field between the vibrating element and reflector is set up whereby a small object may be suspended in mid-air supported only by the radiation pressure. However, the leviation force produced by such a device is limited having application mainly to lighter materials.

SUMMARY OF THE INVENTION

It has been found according to the invention that apparatus for levitating an object can be had wherein the levitation force is enhanced and shaped by providing a curved surface in the surface of one or both of the driver and reflector elements.

A method for increasing and shaping the levitation force in an acoustic resonance system includes machining one or both of a driver and reflector element so as to have a concavely curved surface and spacing the element depending on the curvature. It has been found by providing a spherically curved surface, the levitation force is increased and shaped enabling the support of heavier materials.

Accordingly, an important object of the present invention is to provide apparatus for enhancing the levitation force in an acoustic resonance system by which an object may be levitated.

Yet another important object of the present invention is to provide an acoustic resonance system in which an object is suspended in a gaseous medium wherein the pressure wave pattern may be advantageously shaped.

Yet another important object of the present invention is the provision of a method for increasing and shaping the levitation force in an acoustic resonance system whereby heavier elements and more difficult liquid specimens may be 1 evitated.

BRIEF DESCRIPTION OF THE DRAWING

The constructed designed to carry out the invention will be hereinafter described, together with other features thereof.

The invention will be more readily understood from a reading of the following specification and by reference to the accompanying drawing forming a part hereof, wherein an example of the invention is shown and wherein:

FIG. 1 is a diagrammatic isometric view illustrating apparatus for enhancing and shaping the levitation forces in an acoustic resonance system according to the invention;

FIG. 1a is a sectional view illustrating a concave curved surface of an acoustical driver and reflector according to the invention;

FIG. 2 is a plan view of a spherically curved surface of a driver and reflector surface according to the invention;

FIG. 3 is a plan view illustrating an alternate form of a curved elliptical driver and reflector surface according to the invention; and FIG. 4 is a plan view of a field shaping ring according to the invention.

DESCRIPTION OF A PREFERRED EMBODIMENT

The drawing illustrates apparatus and a method for enhancing and shaping an acoustical levitation field in an acoustic resonance system of the type wherein an ultrasonic transducer generates a high-frequency radiation field in which a specimen of material is levitated in a gaseous medium. The apparatus includes an acoustical driver element A and a concavely curved surface formed at one end of the driver element. An acoustical reflector B is spaced above the driver element. A concavely curved reflector surface is formed at one end of the reflector element disposed opposing the concavely curved surface of driving element A. The acoustical driver element is operably connected to the ultrasonic transducer for generating a high-frequency radiation pressure field whereby an increased levitation force is produced between the curved surfaces of the driver and reflector elements.

The driver element A is formed as a solid cylindrical element of any suitable material such as aluminum having a concavely curved surface 10 formed at the free end thereof. The driving element is coupled with a magnetic driving device 12 and together form an ultrasonic transducer which may be driven by a conventional amplifier circuit. The ultrasonic transducer may be any suitable device such as a magnetostrictive system or a St. Clair device. The schematic illustration of the device in FIG. 1 illustrates the acoustic system in the form of a basic St. Clair device which operates in a gaseous environment such as air. The conventional flat surface of the device has been replaced by a specially curved surface in accordance with the invention formed by any suitable means such as machining. Details of a conventional St. Clair device may be had by reference to an article entitled "An Electromagnetic Sound Generator For Producing Intense High Frequency Sound" by H. W. St. Clair appearing in the May, 1941 issue of *Review of Scientific Instruments*, pages 250 through 256. The reflector element B includes a cylindrical element such as aluminum having a concavely curved surface 114 formed in one end thereof which faces and opposes the concave surface 10 of the driving element. The reflector element B may be secured and affixed by any suitable means at 16 in a properly spaced position directly above the driver element A.

It has been found according to the invention that when the surfaces of the driver and reflector are curved concavely a standing pressure wave pattern is created which has an enhanced levitation force along the axis 18. While the drawing illustrates both surfaces 10 and 14 of the respective driver and reflector elements as being curved, it has been found that other combinations of curved surfaces also produce an enhanced levitation force and that only one of the surfaces of either the driver or reflector elements may be curved producing advantageous results. When the opposing surfaces of both elements A and B are curved, the levitation force may be increased by an approximate factor of 6. When only one of the driver or reflector surfaces is specially curved, it has been found that the levitation force is increased approximately by a factor of 2. It has also been found that if the reflector surface is provided with a greater radius of curvature than the driver element, more stability in the resulting radiation pressure field can be had.

In one example, a reflector element B was utilized with a concavely curved surface 14 having a 4 inch radius of curvature and driver element A was provided with a spherically curved surface 10 having a 2 inch radius of curvature. It has further been found that the best results are achieved by spacing the respective opposed surfaces of driver element A and reflector element B by a distance approximately equal to the smallest radius of curvature. Thus, in the above example, the desired spacing would be a distance of 2 inches.

Field shaping means for shaping the standing pressure wave field may be provided in the form of a washer element 20 having a solid ring portion 22 and a circular central aperture 24. With the shaping disk 20 carried intermediate the driver and reflector elements as illustrated in FIG. 1, pressure wave patterns may be focused or shaped within the central aperture 24 so as to produce an enhanced levitation force at a levitation node 26.

The concave surfaces 10 and 12 may be advantageously shaped other than spherically. For example, an extension of the invention would be to utilize an elliptical shaped surface 10a, curved concavely, to obtain multiple off/axis levitation nodes in the standing wave pattern. The use of multiple off/axis levitation nodes would have application to liquid coalescence. In such an application, the shaping disk means 20 or similar ring elements, screens, and other passive or secondary reflectors may be utilized at different points about the axis to achieve a stable liquid configuration and to fine tune the acoustic field. Another application for plural nodes in a horizontal plane would be in heat of mixing experiments for phase diagram calculations. Two different liquids or materials can be suspended at two different levitation nodes and heated. The material may be brought together, such as by tuning at an off/resonance frequency, and the heat of mixing determined.

The enhancement and shaping of levitational forces according to the invention can be carried out by machining the planar surface of a St. Clair acoustic driver, machining a spherically curved surface in the planar face of a conventional reflector element and spacing the driver and reflector elements a distance approximately equal to the radius of curvature of the elements, or the smaller curvature if different. The system may then be tuned to its resonant frequency.

It has been found utilizing curved surfaces in an acoustical resonance system according to the invention that the increased levitation forces produced therein are capable of levitating platinum which has a density more than five (5) times that of iron oxide which is about the heaviest object that can be levitated in an acoustic resonance system utilizing a conventional St. Clair device having planar driving and reflector surfaces.

Thus, it can be seen that an advantageous apparatus and method can be had according to the invention wherein the levitation force of an acoustic resonance system may be greatly enhanced and shaped whereby much heavier objects may be suspended and liquid substances better contained.

While a preferred embodiment of the invention has been described using specific terms, such description is for illustrative purposes only, and it is to be understood that changes and variations may be made without departing from the spirit or scope of the following claims.

What is claimed is:

1. Apparatus for enhancing and shaping acoustical levitation forces in an acoustic resonance system in which a specimen of material may be suspended in a fluid medium, said apparatus comprising:
    an acoustical driver element;
    a concavely curved surface formed at an end of said driver element;
    an acoustical reflector element spaced above said driver element;
    a concavely curved reflector surface formed at an end of said reflector element faced opposing said concavely curved surface of said driving element; and
    drive means operatively connected to said acoustical driver element for generating a high frequency radiation pressure field in which an enhanced, shaped levitation force is produced between said curved surfaces of said driver and reflector elements;
    whereby heavier materials and liquid substances may be levitated and better contained.

2. The apparatus of claim 1 wherein said concave driver and reflector surfaces are spherical.

3. The apparatus of claim 1 wherein said concave driver and reflector surfaces are elliptical.

4. The apparatus of claim 1 wherein said concavely curved surface of said reflector element has a greater curvature than that of said driver element.

5. The apparatus of claim 4 wherein the spacing between said driver and reflector elements is at least approximately equal to the radius of curvature of said concavely curved driver element surface.

6. The apparatus of claim 1 including shaping means disposed intermediate said driver and reflector elements for shaping the pressure wave pattern in the acoustical field.

7. Acoustical levitation apparatus for levitating a specimen of a material in a gaseous media comprising:
    an acoustical driver element;
    an acoustical reflector element spaced above said driver element in an opposing manner;
    means operatively connected to said driver element for generating a high-frequency radiation field so as to produce a levitation force between said driver and reflector elements; and a concavely curved surface formed at an end of one of said vibrating or reflecting elements whereby an enhancing levitation force is produced.

8. The apparatus of claim 7 wherein the spacing between said vibrating and reflecting element is at least approximately equal to the radius of curvature of said concavely curved surface.

9. The apparatus of claim 7 including shaping means disposed intermediate said driving and reflecting elements for shaping the pressure wave pattern in the acoustical field.

10. A method for enhancing and shaping levitation force in an acoustical resonance system of the type having an ultrasonic transducer having a driver element for generating a high-frequency standing wave pressure field and a reflector element whereby a levitation force is produced by said pressure field intermediate said driver and reflector elements, said method comprising the steps of forming an outwardly concaved curve surface in the surface of one of said driver and reflector surfaces and spacing said reflector element a predetermined distance above said driver element as a function of the curvature of said surface.

11. The method of claim 10 including forming a concavely curved surface in both end surfaces of said driver and reflector elements.

12. The method of claim 11 wherein said driver element surface is provided with a smaller curvature than said reflector surface.

13. The method of claim 12 including spacing said driver and reflector elements a distance approximately equal to the smaller radius of curvature of said curved surfaces.

* * * * *